(12) United States Patent
Cheng

(10) Patent No.: US 8,038,400 B2
(45) Date of Patent: Oct. 18, 2011

(54) HIGH-EFFICIENCY WINDMILL

(76) Inventor: Peter S. Cheng, New Territories (HK)

(*) Notice: Subject to any disclaimer, the term of this patent is extended or adjusted under 35 U.S.C. 154(b) by 403 days.

(21) Appl. No.: 12/425,533

(22) Filed: Apr. 17, 2009

(65) Prior Publication Data

US 2010/0266403 A1    Oct. 21, 2010

(51) Int. Cl.
*B63H 5/10* (2006.01)
(52) U.S. Cl. .................................... 416/132 B
(58) Field of Classification Search ............ 416/44, 416/124, 132 B
See application file for complete search history.

(56) References Cited

U.S. PATENT DOCUMENTS

| | | | |
|---|---|---|---|
| 4,681,512 A * | 7/1987 | Barnard | 416/132 B |
| 6,688,842 B2 * | 2/2004 | Boatner | 415/4.2 |
| 7,040,858 B2 * | 5/2006 | Suzuki | 416/132 B |
| 2007/0189889 A1 * | 8/2007 | Yokoi | 415/4.4 |

* cited by examiner

*Primary Examiner* — Chandra Chaudhari
(74) *Attorney, Agent, or Firm* — Kirschstein et al.

(57) ABSTRACT

A high-efficiency windmill includes an inner rotor having propellers for capturing wind blowing along a wind direction to push the inner rotor about an axis, and an outer rotor rotatable about the same axis independently of the inner rotor radially exteriorly of the inner rotor. The outer rotor is self-positionable in a rotor position about the axis in response to the wind direction. The outer rotor has an airfoil-shaped vane having a forward surface generally facing the wind in the rotor position, and a rear surface generally facing away from the wind in the rotor position. The rear surface creates a negative pressure zone by accelerating the wind across the rear surface. At least one of the propellers adjacent the airfoil-shaped vane in the rotor position is pulled by the negative pressure zone to assist the wind in pushing the propellers about the axis.

20 Claims, 4 Drawing Sheets

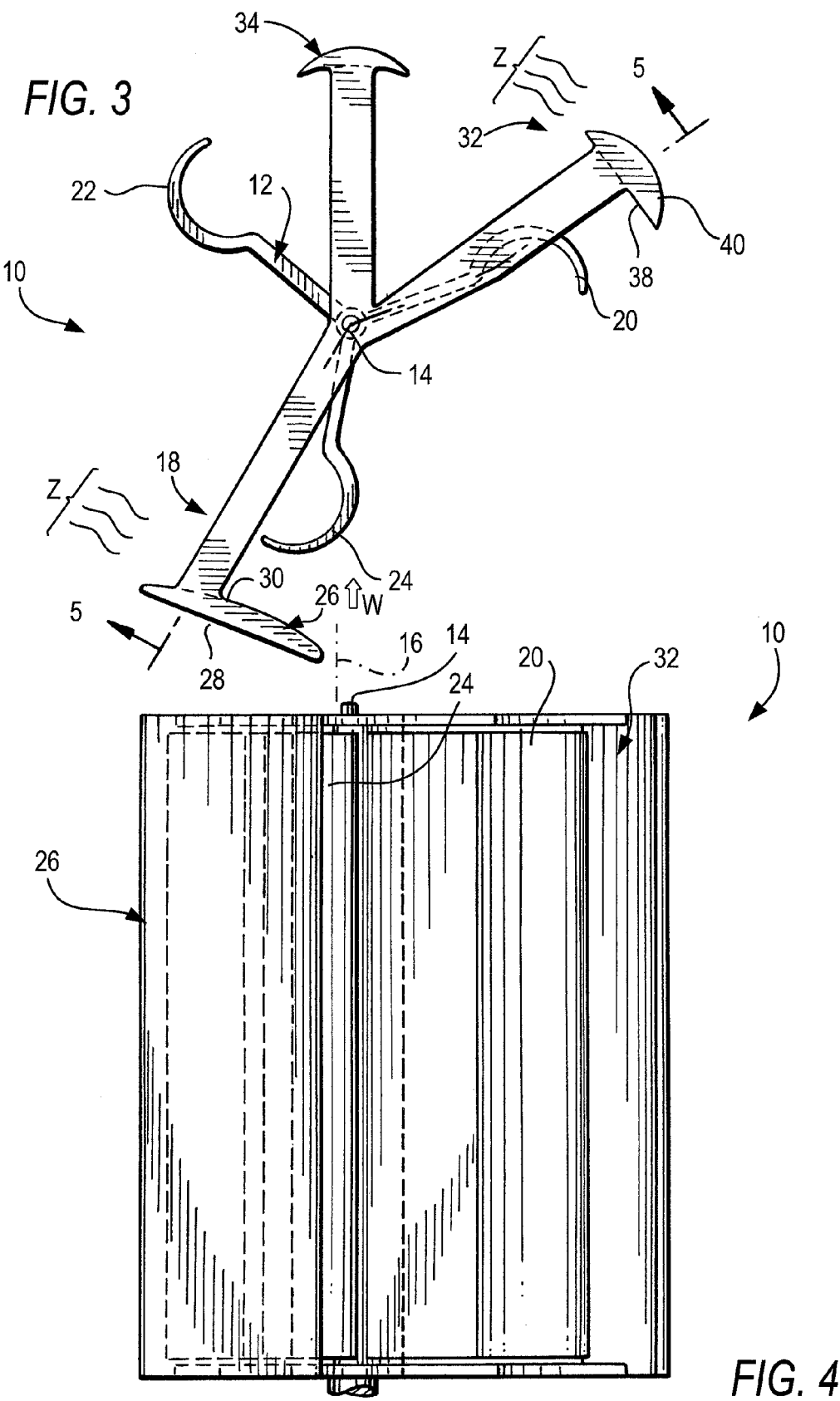

HIGH-EFFICIENCY WINDMILL

BACKGROUND OF THE INVENTION

This invention generally relates to a windmill for capturing and converting the power of the wind to rotational mechanical energy especially to generate electricity and, more particularly, to increasing operational efficiency of the windmill.

Despite its variability, the wind has for a long time been a proven power source to drive mills, pumps, electrical generators and other devices and loads. A so-called horizontal axis windmill has an axis of rotation oriented generally parallel with respect to the surface of the Earth, and has a plurality of blades, vanes, buckets and like propellers rotating about a horizontal axis. The horizontal axis windmill is quite efficient as long as the axis of rotation is aligned with the wind direction. Out of practicality, the horizontal axis windmill is typically provided with means for changing the direction of the horizontal axis as the wind direction changes or has so-called sails of such size that a useful component of power can be derived even from winds of less favorable direction. Large, propeller-type, horizontal axis windmills are typically not built in areas where there is considerable wind turbulence, with quick changes in wind direction and force of the wind. Also, in populated areas, the large propeller-type windmills are generally not considered to be environmentally desirable, principally because of fear that the high-speed propellers may pose safety problems, and also because it has been discovered that the high-speed propellers of giant windmills often create eddies in the wind that travel considerable distances, rattling windows in houses and creating objectionable noise.

A second form of windmill, a so-called vertical axis windmill, has propellers arranged for unitary rotation about a central vertical axis oriented generally perpendicularly with respect to the surface of the Earth and, hence, is operated by wind from any direction. This vertical axis windmill is not as efficient as those with a horizontal axis, since half of the propellers captures the wind for a given wind direction, while the other half does not. Yet, the vertical axis windmill is advantageous in that it has a much lower cost of construction than the horizontal axis windmill; it operates at a much lower noise level that is more readily acceptable in populated areas than the horizontal axis windmill; and it can be locally erected on-site, for example, at one's house, thereby avoiding the need and expense for long-range transmission electrical power lines and step-up and step-down transformers typically used with the horizontal axis windmill.

To compensate for the lower efficiency of the vertical axis windmill, as well as to increase the efficiency of the horizontal axis windmill, the art has proposed using twisted propellers, but portions of these propellers do not work full-time. The art has also proposed adjusting the propellers according to wind speed and direction; however, such adjustable propellers typically do not well withstand high wind conditions. The art has still further proposed using external scoops to collect and channel more wind to the propellers; yet, this construction typically configures the propellers smaller than they would otherwise be. Accordingly, it would be advantageous to further increase the operational efficiency of both the vertical and the horizontal axis windmill without relying solely on these proposed constructions.

SUMMARY OF THE INVENTION

One aspect of this invention is directed to a high-efficiency windmill, which includes an inner rotor rotatable about an axis, and an outer rotor rotatable about the same axis independently of the inner rotor. The inner rotor has propellers for capturing wind blowing along a wind direction to push the inner rotor about the axis. Preferably, the propellers are equiangularly arranged about the axis, and each propeller is a curved blade.

According to one feature of this invention, the outer rotor is self-positionable in a rotor position about the axis in response to the wind direction. The outer rotor has an airfoil-shaped vane having a forward surface generally facing the wind in the rotor position, and a rear, preferably curved, surface generally facing away from the wind in the rotor position. The rear surface creates a negative pressure zone by accelerating the wind across the rear surface. At least one of the propellers adjacent the airfoil-shaped vane in the rotor position is pulled by the negative pressure zone to assist the wind in pushing the propellers about the axis.

According to another feature of this invention, the outer rotor also has a counterbalancing vane for counterbalancing the airfoil-shaped vane to maintain the outer rotor in the rotor position, and further has a rudder vane, preferably with a generally T-shaped cross-section, for aligning the outer rotor along the wind direction in the rotor position. The vanes are spaced angularly apart about the axis. The counterbalancing vane can also be formed with a forward surface generally facing the wind in the rotor position, and a rear, preferably curved, surface generally facing away from the wind in the rotor position. The rear surface of the counterbalancing vane creates another negative pressure zone by accelerating the wind across the rear surface of the counterbalancing vane, thereby assisting the airfoil-shaped vane in pulling the inner rotor about the axis.

In a preferred construction, the inner rotor is mounted on a shaft extending along the axis to drive the shaft about the axis. The axis may be oriented vertically to form a vertical axis windmill embodiment, or horizontally to form a horizontal axis windmill embodiment. The outer rotor is mounted on the shaft for rotation relative thereto radially exteriorly of the inner rotor. An electrical generator or other device or load is operatively coupled to the shaft.

Another aspect of this invention is directed to a method of increasing efficiency of a windmill, which is performed by capturing wind blowing along a wind direction with propellers on an inner rotor to push the inner rotor about an axis, by mounting an outer rotor for rotation about the same axis independently of the inner rotor, the outer rotor being self-positionable in a rotor position about the axis in response to the wind direction, and by assisting the wind in pushing the inner rotor about the axis by configuring the outer rotor with an airfoil-shaped vane having a forward surface generally facing the wind in the rotor position, and a rear surface generally facing away from the wind in the rotor position, the rear surface creating a negative pressure zone by accelerating the wind across the rear surface, at least one of the propellers adjacent the vane in the rotor position being pulled by the negative pressure zone to assist the wind in pushing the propellers about the axis.

Thus, the operational efficiency of the windmill is enhanced, because the inner rotor is not only pushed by the wind, but also pulled by the negative pressure zone created by the airfoil-shaped vane, and also pulled by the additional negative pressure zone created by the counterbalancing vane. The high-efficiency windmill of this invention has a low cost of construction, operates at a low noise level that is more readily acceptable in populated areas, and is locally erectable on-site, for example, at one's house, thereby avoiding the need and expense for long-range transmission electrical power lines and step-up and step-down transformers.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a top plan view of the windmill of FIG. 1;

FIG. 4 is a front elevational view of the windmill of FIG. 1;

FIG. 5 is a sectional view taken in the direction of the arrows on the line 5-5 of FIG. 3;

DETAILED DESCRIPTION OF THE PREFERRED EMBODIMENTS

Figure 1:
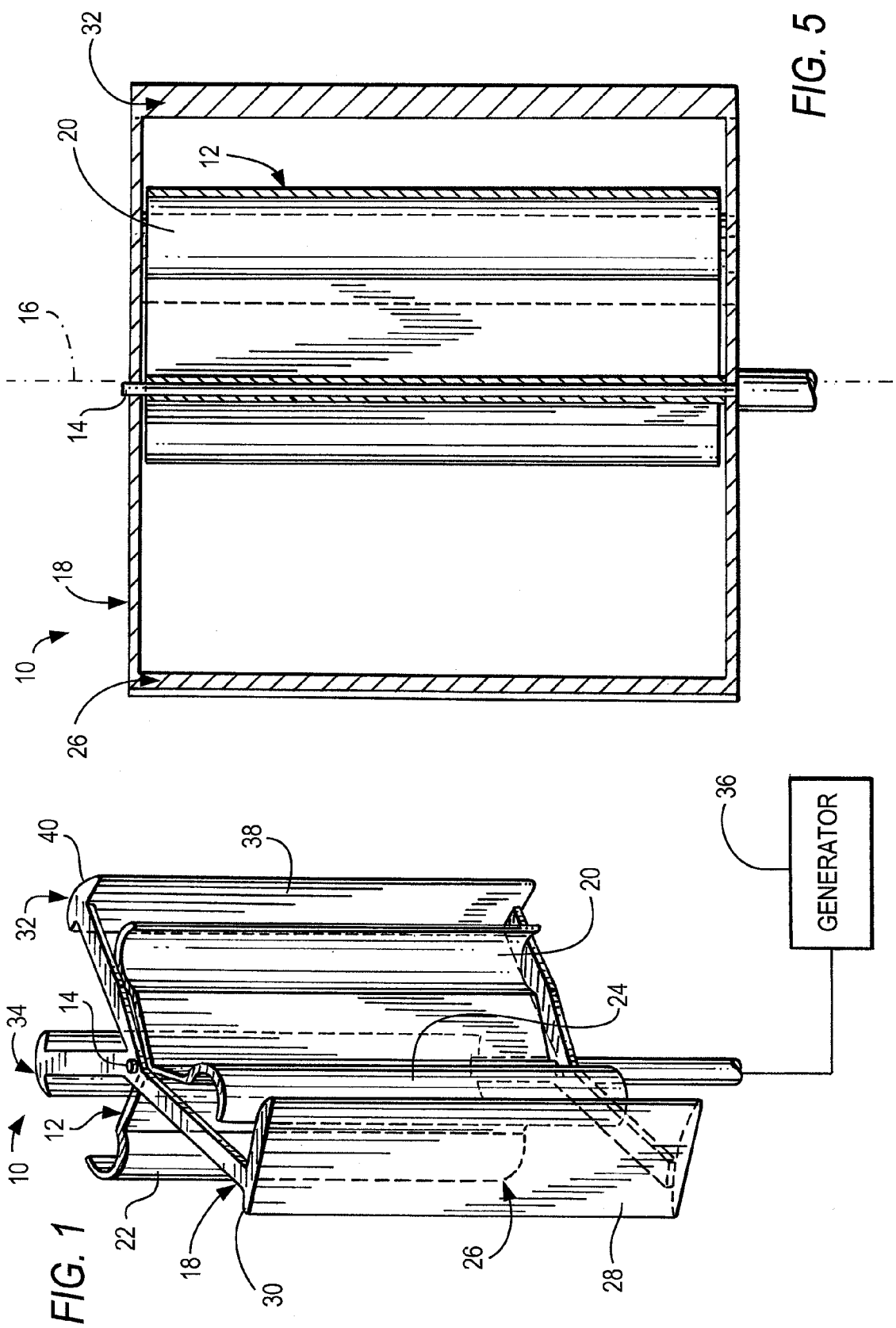
FIG. 1 is a perspective view showing one embodiment of a windmill having a vertical axis operatively connected to a generator in accordance with this invention.
Figure 2:
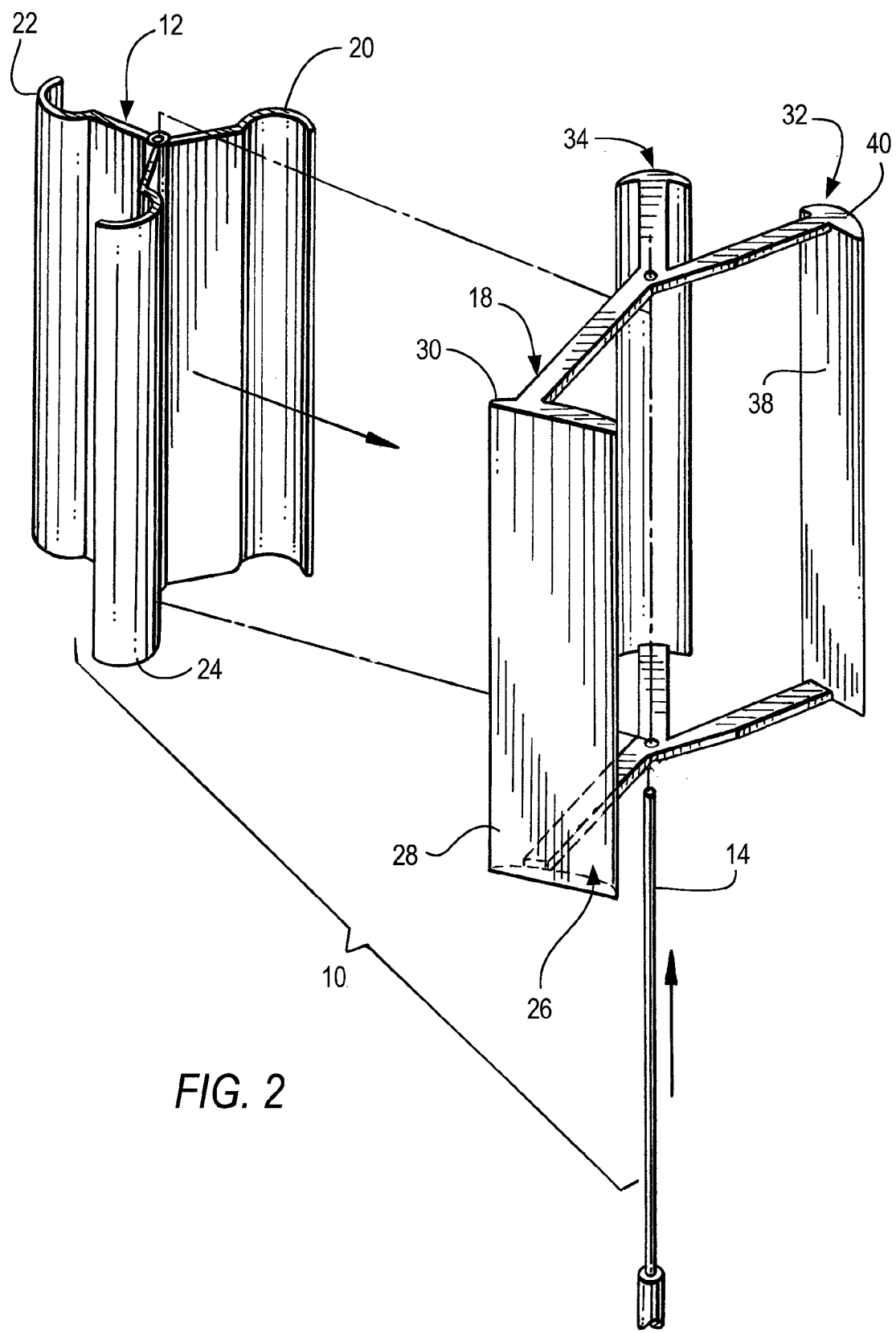
FIG. 2 is a partly broken-away, exploded perspective view of the windmill of FIG. 1.

Referring now to the drawings, reference numeral 10 generally identifies a high-efficiency windmill, which includes an inner rotor 12 fixedly mounted on a shaft 14 extending along a vertical axis 16 for joint rotation with the shaft 14 about the vertical axis 16, and an outer rotor 18 mounted on the shaft 14 for rotation about the same vertical axis 16 relative to the shaft 14 independently of the inner rotor 12 and located radially exteriorly of the inner rotor 12. The inner rotor 12 has a plurality of propellers 20, 22, 24 for capturing wind blowing along a wind direction (see arrow W in FIG. 3) to push the inner rotor 12 about the vertical axis 16. Preferably, the propellers 20, 22, 24 are equiangularly arranged about the vertical axis 16. Although three propellers have been illustrated, more or fewer propellers could be employed. Each propeller 20, 22, 24 is illustrated with a radial arm terminating in a curved blade. Other configurations for the propellers are contemplated for this invention.

The outer rotor 18 is self-positionable in a rotor position about the vertical axis 16 in response to the wind direction W. The outer rotor 18 has an airfoil-shaped vane 26 having a forward surface 28 generally facing the wind in the rotor position, and a rear, preferably curved, surface 30 generally facing away from the wind in the rotor position. The rear surface 30 creates a negative pressure zone (see wavy lines Z in FIG. 3) by the Bernoulli effect by accelerating the wind across the rear surface 30. At least one of the propellers, e.g., 22, adjacent the airfoil-shaped vane 26 in the rotor position is pulled by the negative pressure zone Z to assist the wind in pushing the propellers 20, 22, 24 about the vertical axis 16 (see counterclockwise arrow CW in FIG. 3).

The outer rotor 18 also has a counterbalancing vane 32 for counterbalancing the drag and/or weight of the airfoil-shaped vane 26 to maintain the outer rotor 18 in the rotor position. The counterbalancing vane 32 has a forward surface 38 generally facing the wind in the rotor position, and a rear, preferably curved, surface 40 generally facing away from the wind in the rotor position. The rear surface 40 creates another negative pressure zone (see wavy lines Z in FIG. 3) by the Bernoulli effect by accelerating the wind across the rear surface 40. At least one of the propellers, e.g., 20, adjacent the counterbalancing vane 32 in the rotor position is pulled by the additional negative pressure zone Z to assist the wind in pushing the propellers 20, 22, 24 about the vertical axis 16.

The outer rotor 18 further has a rudder vane 34, preferably with a generally T-shaped cross-section, for aligning the outer rotor 18 along the wind direction W in the rotor position. The counterbalancing vane 32 creates an equal and opposite drag to counterbalance the drag of the airfoil-shaped vane 26. The vanes 26, 32, 34 are spaced angularly apart about the vertical axis. In the rotor position, as best seen in FIG. 3, the wind direction W is depicted in the 6 o'clock position of an imaginary clock; the vane 26 is located anywhere between the 7 o'clock position to the 9 o'clock position; the vane 32 is approximately located in the 3 o'clock position; and the vane 34 is approximately located in the 12 o'clock position.

An electrical generator 36 is operatively coupled to the shaft 14 and converts the rotational energy of the shaft into electrical energy. Other devices and loads are also contemplated to be driven by the windmill.

Figure 6:
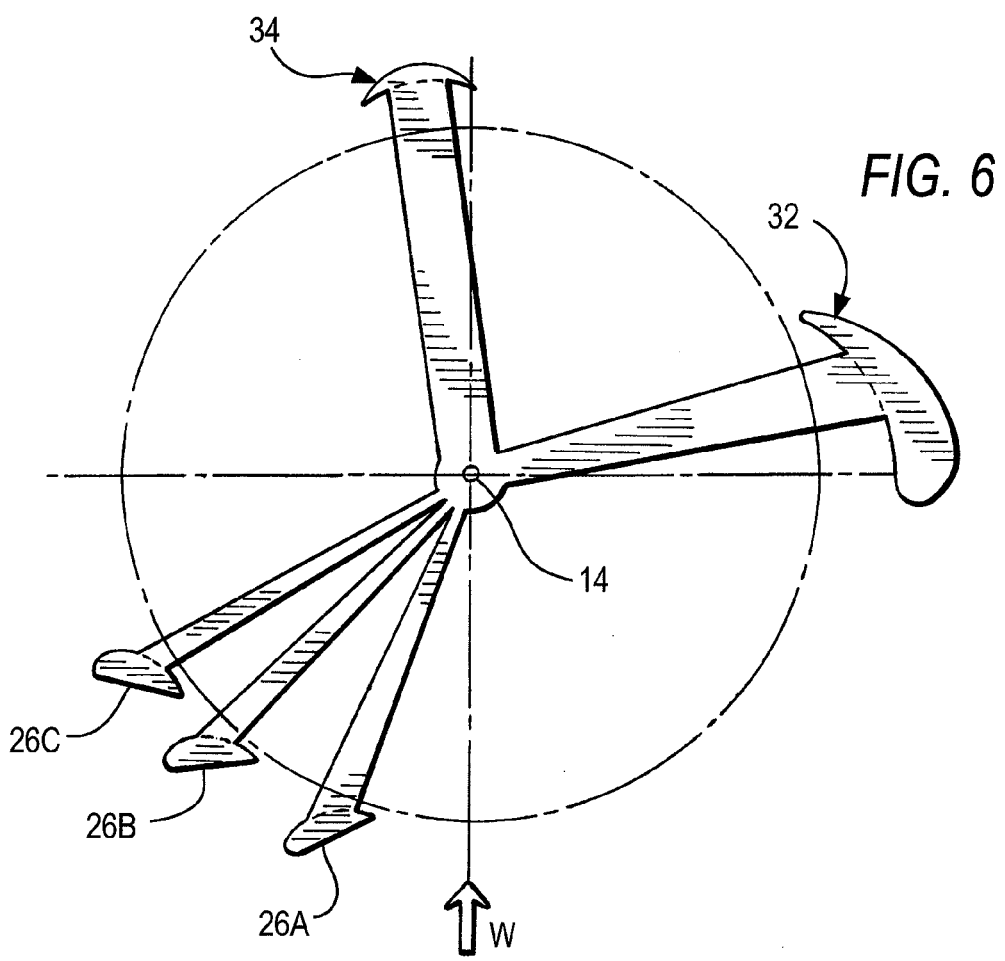
FIG. 6 is a view analogous to FIG. 3, but of a variant construction.

FIG. 6 is analogous to FIG. 3, but shows a variant construction in which the single airfoil-shaped vane 26 is replaced by a plurality of airfoil-shaped vanes 26A, 26B, 26C. Each vane 26A, 26B, 26C can be formed of a rigid, or pliable material.

Figure 7:
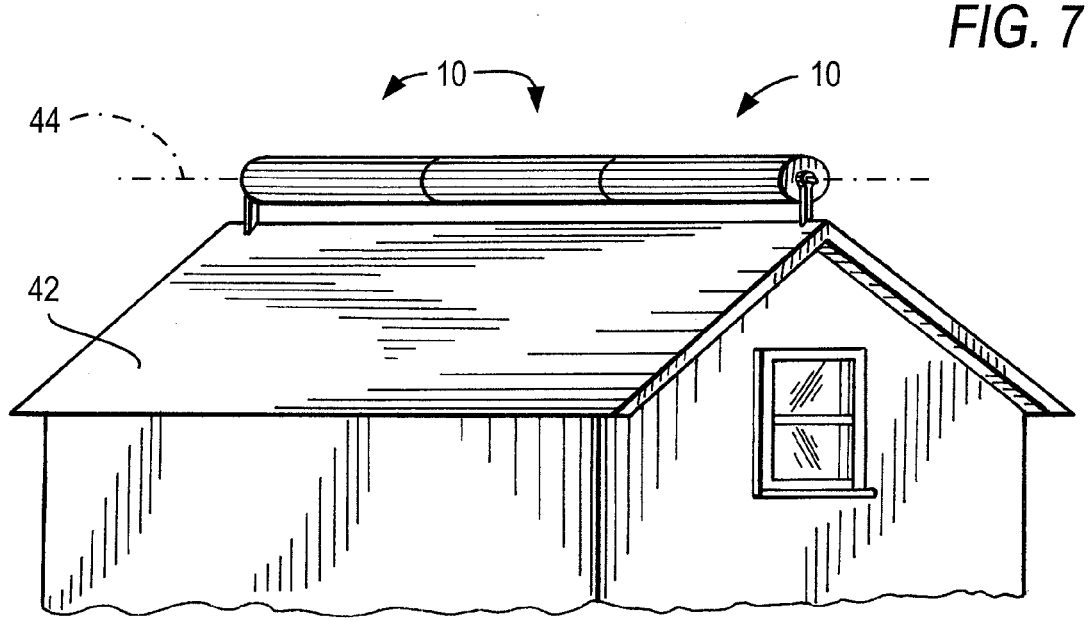
FIG. 7 is a diagrammatic view of another embodiment of a windmill having a horizontal axis mounted on a roof in accordance with this invention.

As described so far, the windmill 10 of FIGS. 1-6 is rotatable about a vertical axis 16. As shown in FIG. 7, the windmill 10 can be mounted on a roof 42 so that its axis 44 of rotation is horizontal. In this embodiment, the counterbalancing vane 32 creates an equal and opposite weight to counterbalance the weight of the airfoil-shaped vane 26.

It will be understood that each of the elements described above, or two or more together, also may find a useful application in other types of constructions differing from the types described above.

While the invention has been illustrated and described as embodied in a high-efficiency windmill and method, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:
1. A high-efficiency windmill, comprising:
an inner rotor rotatable about an axis and having propellers for capturing wind blowing along a wind direction to push the inner rotor about the axis; and
an outer rotor rotatable about the same axis independently of the inner rotor, and self-positionable in a rotor position about the axis in response to the wind direction, the outer rotor having an airfoil-shaped vane having a forward surface generally facing the wind in the rotor position, and a rear surface generally facing away from the wind in the rotor position and creating a negative pressure zone by accelerating the wind across the rear surface, at least one of the propellers adjacent the vane in the rotor position being pulled by the negative pressure zone to assist the wind in pushing the propellers about the axis.

2. The windmill of claim 1, wherein the propellers are equiangularly arranged about the axis.

3. The windmill of claim 1, wherein each propeller is a curved blade.

4. The windmill of claim 1, wherein the rear surface of the airfoil-shaped vane is curved.

5. The windmill of claim 1, wherein the airfoil-shaped vane includes a plurality of airfoil-shaped blades.

6. The windmill of claim 1, wherein the outer rotor has a counterbalancing vane for counterbalancing the airfoil-shaped vane to maintain the outer rotor in the rotor position.

7. The windmill of claim 6, wherein the counterbalancing vane has a forward surface generally facing the wind in the rotor position, and a rear surface generally facing away from the wind in the rotor position and creating another negative pressure zone by accelerating the wind across the rear surface of the counterbalancing vane, at least one of the propellers adjacent the counterbalancing vane in the rotor position being pulled by the other negative pressure zone to assist the wind in pushing the propellers about the axis.

8. The windmill of claim 6, wherein the outer rotor has a rudder vane for aligning the outer rotor along the wind direction in the rotor position.

9. The windmill of claim 8, wherein the vanes are spaced angularly apart about the axis.

10. The windmill of claim 8, wherein the rudder vane has a generally T-shaped cross-section.

11. The windmill of claim 1, and an electrical generator to which the inner rotor is operatively coupled.

12. The windmill of claim 1, wherein the inner rotor is mounted on a shaft extending along the axis to drive the shaft about the axis, and wherein the outer rotor is mounted on the shaft for rotation relative thereto radially exteriorly of the inner rotor.

13. A high-efficiency windmill, comprising:
   an inner rotor rotatable about an axis and having propellers spaced about the axis for capturing wind blowing along a wind direction to push the inner rotor about the axis; and
   an outer rotor rotatable about the same axis independently of the inner rotor radially exteriorly of the inner rotor, and self-positionable in a rotor position about the axis in response to the wind direction, the outer rotor having an airfoil-shaped vane having a forward surface generally facing the wind in the rotor position, and a rear surface generally facing away from the wind in the rotor position and creating a negative pressure zone by accelerating the wind across the rear surface, at least one of the propellers adjacent the airfoil-shaped vane in the rotor position being pulled by the negative pressure zone to assist the wind in pushing the propellers about the axis, the outer rotor also having a counterbalancing vane spaced angularly apart from the airfoil-shaped vane about the axis for counterbalancing the airfoil-shaped vane to maintain the outer rotor in the rotor position.

14. The windmill of claim 13, wherein the counterbalancing vane has a forward surface generally facing the wind in the rotor position, and a rear surface generally facing away from the wind in the rotor position and creating another negative pressure zone by accelerating the wind across the rear surface of the counterbalancing vane, at least one of the propellers adjacent the counterbalancing vane in the rotor position being pulled by the other negative pressure zone to assist the wind in pushing the propellers about the axis.

15. The windmill of claim 13, wherein the outer rotor also has a generally T-shaped rudder vane for aligning the outer rotor along the wind direction in the rotor position.

16. A method of increasing efficiency of a windmill, comprising the steps of:
   capturing wind blowing along a wind direction with propellers on an inner rotor to push the inner rotor about an axis;
   mounting an outer rotor for rotation about the same axis independently of the inner rotor, the outer rotor being self-positionable in a rotor position about the axis in response to the wind direction; and
   assisting the wind in pushing the inner rotor about the axis by configuring the outer rotor with an airfoil-shaped vane having a forward surface generally facing the wind in the rotor position, and a rear surface generally facing away from the wind in the rotor position, the rear surface creating a negative pressure zone by accelerating the wind across the rear surface, at least one of the propellers adjacent the vane in the rotor position being pulled by the negative pressure zone to assist the wind in pushing the propellers about the axis.

17. The method of claim 16, and a step of counterbalancing the airfoil-shaped vane to maintain the outer rotor in the rotor position.

18. The method of claim 16, and a step of aligning the outer rotor along the wind direction in the rotor position.

19. The method of claim 16, and a step of operatively coupling the inner rotor to an electrical generator.

20. The method of claim 16, and a step of orienting the axis along one of a vertical direction and a horizontal direction.

\* \* \* \* \*